(No Model.)

H. F. DETERDING.
RUNNER FOR SEED PLANTERS.

No. 597,396. Patented Jan. 18, 1898.

Attest:
W. P. Smith
S. G. Wells

Inventor.
H. F. Deterding.
by Higdon, Longan & Higdon,
Att'ys.

UNITED STATES PATENT OFFICE.

HENRY F. DETERDING, OF COMMERCE, MISSOURI.

RUNNER FOR SEED-PLANTERS.

SPECIFICATION forming part of Letters Patent No. 597,396, dated January 18, 1898.

Application filed May 17, 1897. Serial No. 636,982. (No model.)

*To all whom it may concern:*

Be it known that I, HENRY F. DETERDING, of the city of Commerce, Scott county, State of Missouri, have invented certain new and useful Improvements in Runners or Plows for Seed-Planters and Grain-Drills, of which the following is a full, clear, and exact description, reference being had to the accompanying drawings, forming a part hereof.

My invention relates to runners or plows for seed-planters and grain-drills; and it consists of the novel construction, combination, and arrangement of parts hereinafter shown, described, and claimed.

Figure 1:
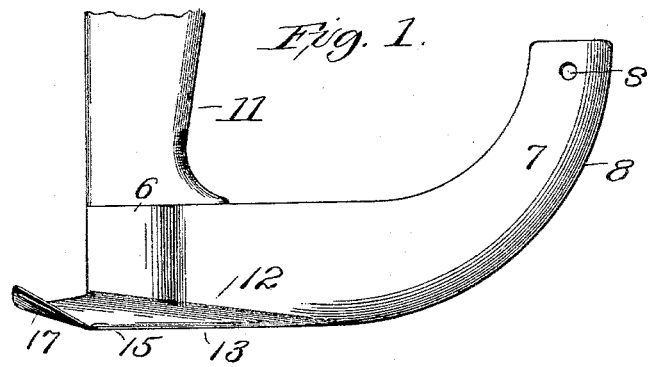
Figure 2:
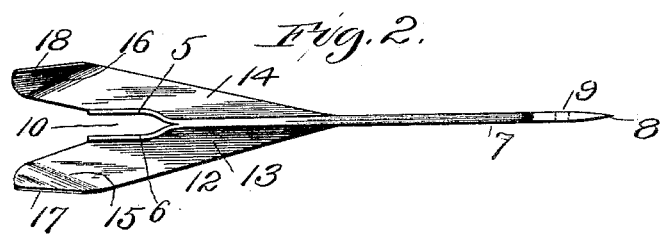
Figure 4:
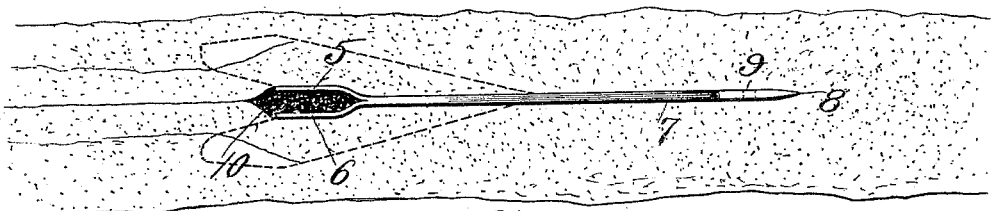
Figure 3:
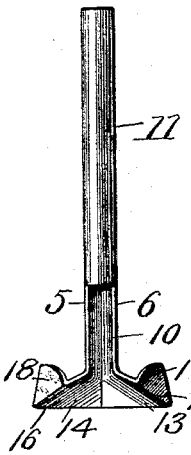

Figure 1 is a side elevation of one of my improved plows for seed-planters, the seed-chute being broken away. Fig. 2 is a top plan view of the plow shown in Fig. 1 with the seed-chute removed. Fig. 3 is a rear elevation of the parts shown in Fig. 1. Fig. 4 is a top plan view analogous to Fig. 2 and illustrating the use and operation of the plow.

My improved plow for seed-planters consists of two pieces 5 and 6 of steel cut or forged into the form of runners and placed side by side and welded together, thus producing the runner-shaped standard 7, the front and lower edge of which is sharpened. An opening 9 is formed horizontally through the upper end of the standard 7 as a means of attaching the plow to the frame. The extreme rear ends of the pieces 5 and 6 are spread apart, thus forming the slot or opening 10, and the grain-chute 11 leads from the hopper into said opening 10. The lower forward edges of the pieces 5 and 6 are turned outwardly in opposite directions upon the lines 12, thus forming the shares 13 and 14, the forward edges of said shares being substantially horizontal and being sharpened. The lines 12 are slightly inclined, the rear ends of said lines being higher than the forward ends, thus giving an incline to the shares 13 and 14, as shown in Fig. 3, the outer edges of the shares being lower than the inner edges. The outer rear corners of the shares 13 and 14 are turned upwardly on the lines 15 and 16 to angles of approximately one hundred and ten degrees relative to said shares, thus producing the rigid colters 17 and 18. The lines 15 and 16 incline toward each other as they run backwardly.

The standard 7 serves as a colter to divide the sod into two pieces. The shares 13 and 14 cut the sod on a horizontal line and the colters 17 and 18 cut the outer edges of the sods, thus practically severing the sods from the ground. The portions forming the slot 10 separate or force the sods apart to form an opening for the seed to pass downwardly into the ground. The sods pass backwardly over the shares 13 and 14 and by the colters 17 and 18 are deflected toward each other and are deposited behind the plow in the same positions they originally occupied, thus covering the seeds which have passed downwardly through the seed-chute. The colters 17 and 18, being inclined inwardly, as they pass backwardly not only serve to cut the sod loose from the turf or ground, but they serve to deflect the sods toward each other, as required to cover the seed.

The plows or shoes may be used on press-drills, corn-drills, and corn-planters.

I claim—

1. In a seed-planter, a plow consisting of a runner-shaped standard having a vertical slot in its rear end to receive the seed from the seed-chute, shares extending sidewise and backwardly from the lower edge of said standard, and rigid colters extending upwardly from the rear outer ends of said shares, substantially as specified.

2. In a seed-planter, a plow consisting of a runner-shaped standard having a vertical slot in its rear end to receive the seed from the seed-chute, shares extending sidewise and backwardly from the lower edge of said standard, and rigid colters extending upwardly from the rear outer ends of said shares, said colters being inclined as required to throw the sods cut by said shares toward each other, substantially as specified.

In testimony whereof I affix my signature in presence of two witnesses.

HENRY F. DETERDING.

Witnesses:
A. MCCAULEY,
S. G. WELLS.